(12) United States Patent
Machocki et al.

(10) Patent No.: US 12,123,296 B2
(45) Date of Patent: Oct. 22, 2024

(54) CONTACTLESS SENSOR MONITORING OF A DRILL STRING CONTROLLED BY A DRILLING PROGRAM

(71) Applicant: SAUDI ARABIAN OIL COMPANY, Dhahran (SA)

(72) Inventors: Krzysztof Karol Machocki, Aberdeen (GB); Arturo Magana-Mora, Dhahran (SA); Chinthaka Gooneratne, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 898 days.

(21) Appl. No.: 17/080,120

(22) Filed: Oct. 26, 2020

(65) Prior Publication Data

US 2022/0127947 A1 Apr. 28, 2022

(51) Int. Cl.
*E21B 44/02* (2006.01)
*E21B 19/00* (2006.01)
(Continued)

(52) U.S. Cl.
CPC ............ *E21B 44/02* (2013.01); *E21B 19/008* (2013.01); *G06F 18/2148* (2023.01);
(Continued)

(58) Field of Classification Search
CPC ...... E21B 19/008; E21B 19/165; E21B 44/00; E21B 44/02
See application file for complete search history.

(56) References Cited

U.S. PATENT DOCUMENTS

| RE24,818 E | 4/1960 | Gresham et al. |
| 3,373,823 A | 3/1968 | Fullerton, Jr. et al. |
| (Continued) | | |

FOREIGN PATENT DOCUMENTS

| CA | 2994334 A1 | 2/2017 |
| CN | 103711431 A | 4/2014 |
| (Continued) | | |

OTHER PUBLICATIONS

International Search Report and Written Opinion issued in Application No. PCT/US2021/056587, mailed on Feb. 25, 2022 (13 pages).

(Continued)

*Primary Examiner* — Kristyn A Hall
(74) *Attorney, Agent, or Firm* — Osha Bergman Watanabe & Burton LLP

(57) ABSTRACT

A monitoring system for a drill string controlled by a drilling program may include a contactless sensor arranged to capture data at a second time. The data may be associated with a parameter at a position along a drill line associated with the drill string. The system may include a processor operatively connected to the contactless sensor. The processor may be configured to access a machine learning (ML) model that is trained using the data captured at a first time, prior to the second time, and an image analysis algorithm. The processor may be configured to identify, using the trained ML model, a condition pertaining to the drill string based on interpreting the data captured at the second time. The processor may be configured to cause an adjustment to the drilling program based on the identified condition.

19 Claims, 8 Drawing Sheets

(51) Int. Cl.
*G06F 18/214* (2023.01)
*G06T 1/00* (2006.01)
*G06T 7/00* (2017.01)

(52) U.S. Cl.
CPC ............ *G06T 1/0014* (2013.01); *G06T 7/001* (2013.01); *G06T 2200/24* (2013.01); *G06T 2207/20081* (2013.01); *G06T 2207/30164* (2013.01); *G06T 2207/30181* (2013.01)

(56) References Cited

U.S. PATENT DOCUMENTS

| | | | |
|---|---|---|---|
| 3,461,978 | A | 8/1969 | Whittle |
| 4,156,467 | A | 5/1979 | Patton et al. |
| 4,312,223 | A | 1/1982 | Koch |
| 4,434,971 | A | 3/1984 | Cordrey |
| 4,610,005 | A | 9/1986 | Utasi |
| 4,616,321 | A | 10/1986 | Chan |
| 4,662,608 | A | 5/1987 | Ball |
| 4,736,297 | A | 4/1988 | LeJeune |
| 4,787,244 | A | 11/1988 | Mikolajczyk |
| 6,354,158 | B1 | 3/2002 | Eidem et al. |
| 2003/0234119 | A1 | 12/2003 | Ray |
| 2015/0345261 | A1 | 12/2015 | Kruspe et al. |
| 2016/0290121 | A1 | 10/2016 | Wesley et al. |
| 2017/0089696 | A1 | 3/2017 | Smith et al. |
| 2018/0245445 | A1 | 8/2018 | Theis et al. |
| 2019/0136650 | A1 | 5/2019 | Zheng et al. |
| 2019/0277135 | A1* | 9/2019 | Zha ................. E21B 49/003 |
| 2020/0173233 | A1 | 6/2020 | Orban et al. |
| 2020/0190959 | A1 | 6/2020 | Gooneratne et al. |
| 2020/0190963 | A1 | 6/2020 | Gooneratne et al. |
| 2020/0200930 | A1 | 6/2020 | Parmeshwar et al. |
| 2020/0224523 | A1 | 7/2020 | Parmeshwar et al. |

FOREIGN PATENT DOCUMENTS

| | | |
|---|---|---|
| CN | 104265262 A | 1/2015 |
| CN | 209040821 U | 6/2019 |
| GB | 2275778 A | 9/1994 |
| RU | 94036257 | 11/1996 |
| WO | 2015051027 A1 | 4/2015 |
| WO | 2016118714 A1 | 7/2016 |
| WO | 2020086594 A1 | 4/2020 |

OTHER PUBLICATIONS

Lai, Stephen William et al., "Stick/Slip Detection and Friction-Factor Testing with Surface-Based Torque and Tension Measurements", SPE-170624-PA, Society of Petroleum Engineers, vol. 31, Issue 2, May 2016 (15 pages).

Lai, Stephen William et al., "Stick-Slip Detection and Friction Factor Testing Using Surface-Based Torque and Tension Measurements", SPE-170624-MS, Society of Petroleum Engineers, Oct. 2014 (18 pages).

* cited by examiner

CONTACTLESS SENSOR MONITORING OF A DRILL STRING CONTROLLED BY A DRILLING PROGRAM

BACKGROUND

Generally, when performing drilling activities to develop an oil or gas field, a field operator company may rely on drilling contractors to execute drilling operations. Such drilling contractors normally work with different types of equipment, and may have different levels of skill.

The variety in equipment and skill level may contribute to inconsistencies in the Rate Of Penetration (ROP) while drilling wells in similar locations. In addition, different drilling crews can respond in different ways when addressing unexpected conditions or events, such as high lateral downhole vibrations, stick-and-slips, or other problems that contribute to a reduced ROP. On some occasions, wrong actions by a drilling crew may cause larger problems, such as stuck pipes, twist-offs, or fatigue failures, which may lead to extensive Non Productive Time (NPT).

Accordingly, there exists a need for a system to monitor a drill string of a drilling system and to identify a condition associated with the drill string based on data obtained during the monitoring of the drill string.

SUMMARY

This summary is provided to introduce concepts that are further described below in the detailed description. This summary is neither intended to identify key or essential features of the claimed subject matter, nor intended to be used as an aid in limiting the scope of the claimed subject matter.

In one aspect, embodiments disclosed herein relate to systems and methods for monitoring a drill string using contactless sensors and machine learning models.

In general, in one aspect, embodiments disclosed herein relate to a monitoring system for a drill string controlled by a drilling program. The system includes a contactless sensor arranged to capture data at a second time. The data is associated with a parameter at a position along a drill line associated with the drill string. The system includes a processor operatively connected to the contactless sensor. The processor is configured to access a machine learning (ML) model that is trained using the data captured at a first time, prior to the second time, and an image analysis algorithm. The processor is configured to identify, using the trained ML model, a condition pertaining to the drill string based on interpreting the data captured at the second time. The processor is configured to cause an adjustment to the drilling program based on the identified condition.

In general, in one aspect, embodiments disclosed herein relate to a method for monitoring a drill string controlled by a drilling program. The method includes, using a contactless sensor, capturing data at a second time. The data is associated with a parameter at a position along a drill line associated with the drill string. The method includes accessing a machine learning (ML) model that is trained using the data captured at a first time, prior to the second time, and an image analysis algorithm. The method includes identifying, using the trained ML model, a condition pertaining to the drill string based on interpreting the data captured at the second time, the identifying being performed by one or more hardware processors. The method includes causing an adjustment to the drilling program based on the identified condition.

In general, in one aspect, embodiments disclosed herein relate to a non-transitory machine-readable storage medium comprising instructions that, when executed by one or more processors of a machine, cause the machine to perform operations. The operations include capturing data at a second time. The data is associated with a parameter at a position along a drill line associated with the drill string. The operations include accessing a machine learning (ML) model that is trained using the data captured at a first time, prior to the second time, and an image analysis algorithm. The operations include identifying, using the trained ML model, a condition pertaining to the drill string based on interpreting the data captured at the second time. The operations include causing an adjustment to the drilling program based on the identified condition.

Other aspects and advantages of the claimed subject matter will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
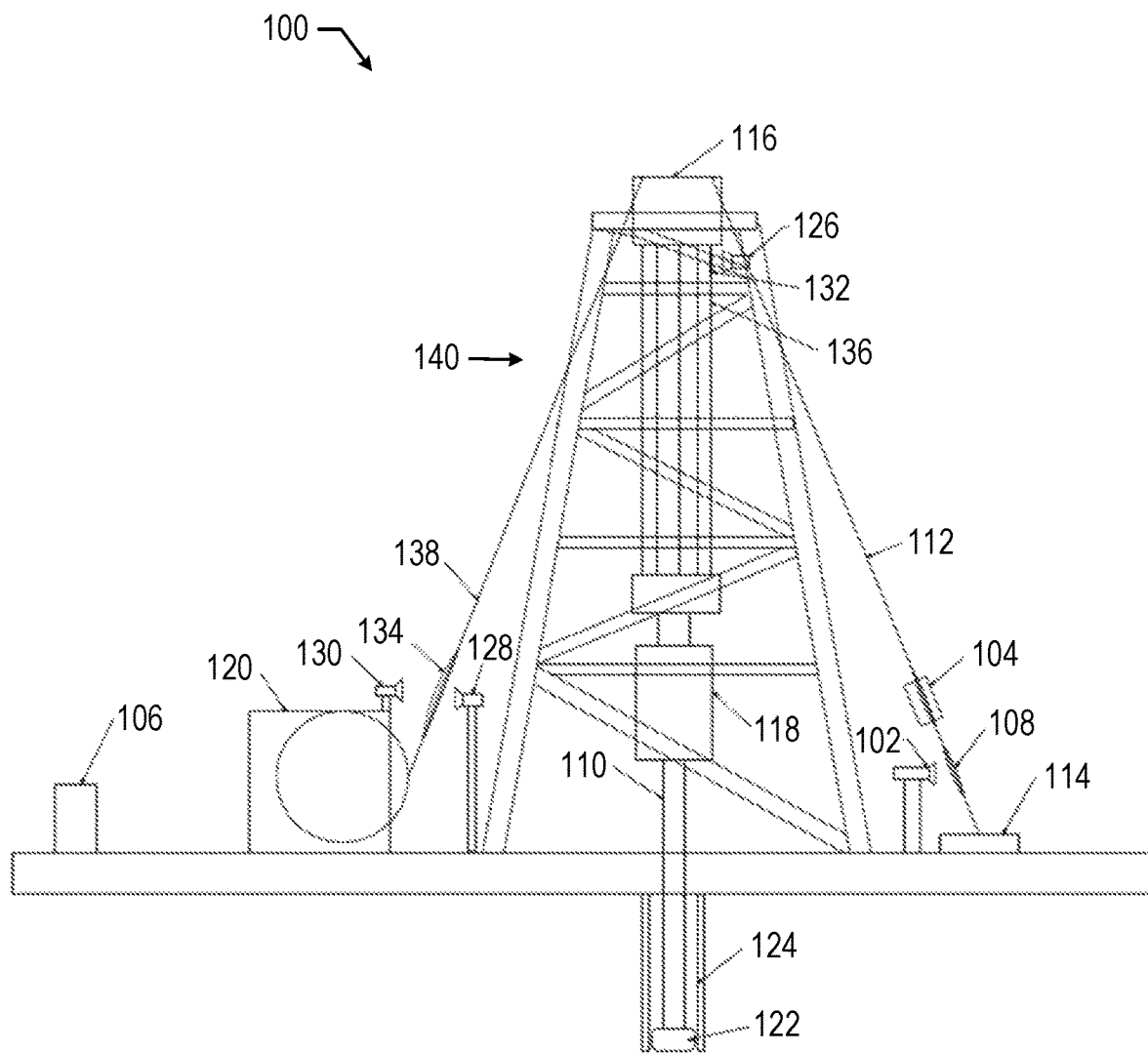
FIG. 1 is a schematic illustration of a well environment, according to one or more example embodiments.

Example systems and methods for contactless sensor monitoring of a drill string controlled by a drilling program are described. Unless explicitly stated otherwise, components and functions are optional and may be combined or subdivided. Similarly, operations may be combined or subdivided, and their sequence may vary.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, or third) may be used as an adjective for an element (that is, any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

A drilling rig is a complex system of various types of equipment that require comprehensive monitoring in order to facilitate an efficient and effective drilling operation. Traditionally, contact sensors have been used to measure various aspects of oil and gas production. However, there exists a need for a system to contactlessly monitor a drill string of a drilling system and to identify an unwanted condition associated with the drill string based on data obtained during the monitoring of the drill string. In some example embodiments, such a monitoring system may automatically diagnose and correct the unwanted condition based on the observable effect on a drill line caused by the vibration or oscillation of the drill string during the operation of the drilling rig.

In one aspect, example embodiments disclosed herein relate to a monitoring system for contactless sensor monitoring of a drill string controlled by a drilling program. The monitoring system includes one or more contactless sensors that may be directed at various areas of a drilling system (e.g., a drill line or an item of equipment attached to, in contact with, or in proximity to the drill line) to automatically capture data describing a physical state of the drill line. Examples of contactless sensors are acoustic sensors, vibration sensors, temperature sensors, wired or wireless cameras, image or vision sensors (e.g., infrared, gamma ray, computed tomography (CT) scan, or x-ray sensors) for image or video capture.

In some instances, the data captured by the one or more contactless sensors is aggregated and synchronized with data captured by one or more contact sensors (e.g., accelerometers) that may be mounted on various areas of the drilling system to capture additional data pertaining to the condition of the drill line. This facilitates the identifying and linking of drill line behavior signatures and downhole event signatures for a more comprehensive analysis of conditions associated with the drilling system.

The monitoring system may analyze the captured data to identify unwanted drill string behavior, such as excessive vibration of the drill line, weight on bit, or inconsistencies in the ROP. Identifying changes in drill line behavior may assist in diagnosing causes of suboptimal drilling operations.

In some example embodiments, the monitoring system trains a machine learning (ML) model, using data captured by one or more sensors at a first time and an image analysis algorithm, to identify an unwanted condition pertaining to the drill string based on interpreting the data captured at the second time. Based on determining a condition that leads to suboptimal drilling operations, the monitoring system may cause an adjustment to the drilling program that controls the drill string in order to optimize the drilling operations (e.g., by increasing the energy transfer to the bit and preventing the destruction of the bottom hole assembly (BHA) components, drill pipes, or drill bit). In some instances, the causing of the adjustment to the drilling program includes determining a further (e.g., optimized) input parameter that may reduce or prevent the unwanted condition that causes the suboptimal drilling operations.

In some example embodiments, the monitoring system performs the data analysis in the cloud. In some example embodiments, the monitoring system performs the data analysis on the surface, at a drilling well site. In some example embodiments, the data analysis is performed on a smart sensor by one or more processors included in the smart sensor.

An advantage of the monitoring system is the ability to automatically identify and correct, in real-time or near real-time, an undesired condition of a drill string based on data descriptive of a drill line, automatically captured using contactless sensors directed at the drill line. Another advantage is the increased accuracy in determining the cause of undesired conditions associated with the drill string. A third advantage is the minimization or elimination of human error with respect to the identifying of solutions to correct the undesired conditions of the drill string in order to improve the operations of a drilling system.

FIG. 1 is a schematic illustration of a well environment 100, according to one or more example embodiments. The well environment 100 includes a drilling rig 140 with a well 124 extending from the surface into a target zone of a formation, such as a reservoir. The drilling rig 140 may include a drill string 110, a drill line 112 (also shown as items 136 and 138), a dreadline anchor 114, a crown block 116, a top drive 118, a drawworks 120, and a drill bit 122.

During drilling activities, the drill line 112 may undergo various changes depending on downhole activities, events, or conditions. For example, the tension, movement, or shape of the drill line 112 may change based on a change occurring downhole. Each downhole behavior and drilling operation manifests itself in a unique pattern of changes (e.g., a signature) of the drill line 112 that can be registered (e.g., captured) by one or more censors arranged to capture data along the drill line 112.

In some example embodiments, the well environment 100 also includes one or more contactless sensors 102, 126, 128, and 130 that are directed at various areas (e.g., 108, 132, and 134) of the drill line 112 to capture data pertaining to one or more parameters associated with the drill line 112 or other drilling equipment. Examples of the one or more parameters are Revolution Per Minute (RPM), weight on bit, torque, water flow, movement of the drill line, deformation of the drill line, tension of the drill line, and noise. In some instances, the well environment 100 may also include a contact sensor 104 that is attached to the drill line 112 to capture data pertaining to the one or more parameters.

In various example embodiments, one or more additional contact or contactless sensors are attached to or directed at an item of equipment attached to, in contact with, or in proximity to the drill line 112 to capture additional data pertaining to the drill line 112 or other parts of the drilling rig 140. An analysis module 106 may aggregate and synchronize the data captured by the sensors 102, 104, 126, 128, and 130 in real-time for rapid analysis. An analysis, by the analysis module 106, based on the aggregated and synchronized sensor data may improve a drilling program based on a more comprehensive understanding of how downhole events manifest themselves in physical state changes of various parts of the drilling rig 140.

The analysis module 106 may recognize, based on the signatures of the drill line 112, that unwanted downhole events, such as stick-and-slips, BHA whirl, or bit bouncing, are occurring, and may cause an adjustment to the drilling program to reduce potential or actual damage to the drilling equipment. In some example embodiments, the analysis module 106 trains a machine learning model to identify when an unwanted downhole condition is occurring based on data captured by the one or more sensors 102, 104, 126, 128, and 130.

The data captured by the one or more sensors 102, 104, 126, 128, and 130 may be transmitted wirelessly, by wire, or any other means to the analysis module 106. In some example embodiments, as shown in FIG. 1, the analysis module 106 is located within the well environment 100, in close proximity to the sensors 102, 126, 128, and 130. In certain example embodiments, the analysis module 106 is located remotely (e.g., on a different drilling rig or in the cloud).

In some embodiments, the one or more sensors 102, 104, 126, 128, and 130 and the analysis module 106 are included in a monitoring system for monitoring the drill string 110. The monitoring system may include a computer system that is similar to the computer systems 1000 and 1014 described with regard to FIGS. 8A and 8B, respectively, and the accompanying descriptions.

Figure 2:
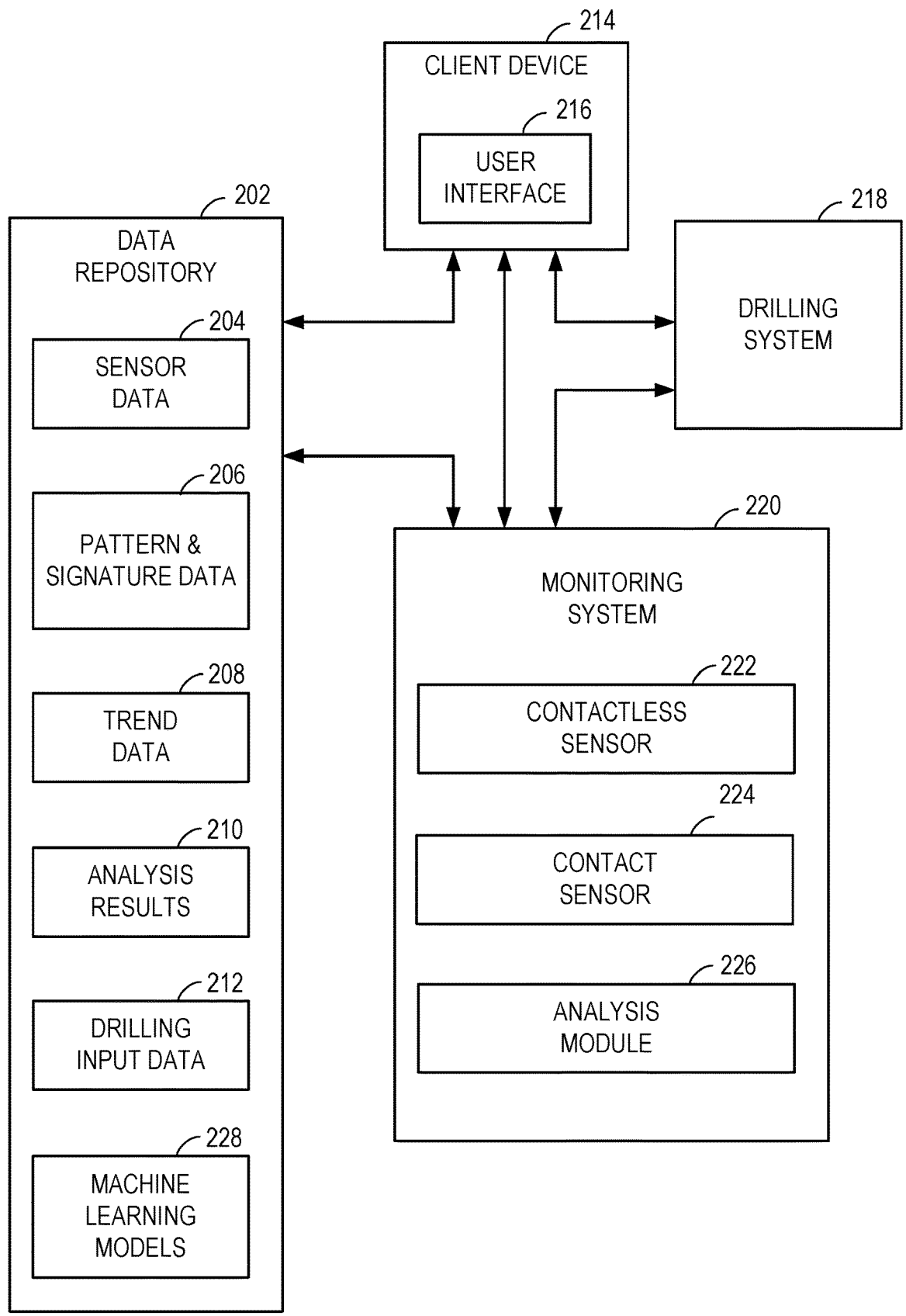
FIG. 2 is a block diagram that illustrates a monitoring system, according to one or more example embodiments.

FIG. 2 is a block diagram that illustrates a monitoring system 220, and the other parts of a system that interact with the monitoring system 220, according to one or more example embodiments. The monitoring system 220 is shown as including a contactless sensor 222 (shown as the sensors 102, 126, 128, and 130 in FIG. 1), a contact sensor 224 (shown as the sensor 104 in FIG. 1), and an analysis module 226 (shown as the analysis module 106 in FIG. 1). The components of the monitoring system 220 are operatively connected and are configured to communicate with each other (e.g., via a bus, shared memory, a switch, wirelessly, etc.).

The contactless sensor 222 is arranged to capture data associated with a parameter at a position along a drill line (shown as the drill line 112 in FIG. 1) associated with the drill string (shown as the drill string 110 in FIG. 1) of a drilling system (shown as the drilling rig 140 of FIG. 1). Examples of the parameter are a tension, a movement, and a noise of the drill line. The sensor data 204 may be interpreted (e.g., processed or analyzed) by the analysis module 226 to identify an undesired condition (hereinafter also "a condition") of the drill string. Examples of undesired conditions of the drill string are BHA failures, bit bouncing, bit whirl, premature wear of the drill bit, BHA whirl, torsional oscillation, high lateral downhole vibrations, stick-and-slips, twist-offs, and fatigue failures. If the monitoring system 220 utilizes several contactless sensors 222, the analysis module 226 may aggregate and synchronize the data captured by the several contactless sensors 222 included in the monitoring system 220.

In some example embodiments, a contact sensor 224 is placed in contact with a component of a drilling system (e.g., the drill line 112) to capture additional data pertaining to the drilling system. The analysis module 226 may aggregate and synchronize the data captured by the contactless sensor 222 and the contact sensor 224.

In some example embodiments, to identify the undesired condition, the analysis module 226 may compare the captured sensor data 204 and pattern and signature data 206 associated with known conditions of the drill string to identify a match that indicates a particular undesired condition associated with the drill string. In addition, the analysis module 226 may identify data trends based on the sensor data 204, which may be helpful in predicting future problems with the drill string or other components of the drilling system.

In addition to generating various analysis results 210 (e.g., identified undesired conditions), the analysis module 226 may generate an optimized input value for an input drilling parameter used in the operation of drilling equipment. The optimized input value may be determined based on the analysis results. Causing an adjustment to a drilling program based on the optimized input value (e.g., providing the optimized input value to an operating item of drilling equipment having the undesired condition) may reduce the undesired condition and improve the operation of the drilling system.

As shown in FIG. 2, the monitoring system 220 is configured to communicate with data repository 202 to access and store various types of data. The data repository 202 stores the sensor data 204, pattern and signature data 206, trend data 208, analysis results 210, drilling input data 212, and one or more machine learning models 228. In some example embodiments, the sensor data 204 includes the sensor data that was received from several sensors and that has been aggregated and synchronized.

The pattern and signature data 206 may include data descriptive of various patterns or signatures associated with known conditions of the drill string. A match, identified by the analysis module 226, between the captured sensor data 204 and the pattern and signature data 206 associated with a particular known condition of the drill string, in some instances, indicates that the particular undesired condition associated with the drill string is present in a drilling system 218.

The trend data 208 may include data that identifies data trends based on the sensor data 204. A trend is the general direction of the change in the values of a parameter over a period of time. The trend data 208 may be helpful in predicting future problems with the drill string or other components of the drilling system 218.

The analysis results 210 may include data descriptive of the identified undesired conditions. The drilling input data 212 may include optimized input values for the input drilling parameters used in the operation of the drilling equipment.

The one or more machine learning models 228 may include artificial intelligence models that are trained to identify various undesired conditions pertaining to the drill string based on interpreting the sensor data 204 captured by the contactless sensors 222, the contact sensors 224, or a combination thereof at various times during the operation of the drilling system 218.

The monitoring system 220 is also configured to communicate with a drilling system 218 to cause an adjustment to the drilling program that controls the drill string, based on the interpreted sensor data 204. In some example embodiments, the causing of the adjustment to the drilling program includes causing a modification in the functionality of an item of equipment associated with the identified condition (e.g., the drill string). In various example embodiments, the causing of the adjustment to the drilling program includes transmitting an instruction to the drilling system 218 based on detecting an undesired condition pertaining to the drill string.

Further, the monitoring system 220 is configured to communicate with a client device 214 that includes a user interface 216. The client device 214 may include a computing device that includes at least a display and communication capabilities to communicate with the monitoring system 220, the data repository 202, and the drilling system 218 via an electronic network. The client device 214 may comprise, but is not limited to, a computer, a work station, a desktop, a laptop, a tablet, a smart phone, a handheld device, an Internet appliance, a wearable device, a smart phone, a cellular (or mobile) phone, a multi-processor system, a mini-computer, etc. The user interface 216 may be a graphical user interface (GUI) or a command line interface. The user interface 216 may display data retrieved, accessed, or received from the data repository 202, the monitoring system 220, and the drilling system 218 on a display device, such as a computer monitor or a touchscreen on the client device 214. Furthermore, the user interface 216 may present data directly to the user, for example, data presented as actual data values through text, or rendered by the client device 214 into a visual representation of the data, such as through visualizing a data model.

In some example embodiments, the monitoring system 220 generates an alert based on the detected condition pertaining to the drill string, and causes display of the alert in the user interface 216. A user of the client device 214 may access the monitoring system 220 via the user interface 216, for example, to make configuration changes to the sensor 222 or the analysis module 226. The client device 214 is also configured to communicate with the data repository 202 to access and store data. In addition, the client device 214 is also configured to communicate with the drilling system 218.

The analysis module 226 may be implemented using hardware (e.g., one or more processors of a machine) or a combination of hardware and software. For example, the analysis module 226 may configure one or more processors to perform the operations described herein for the analysis module 226. According to another example, the analysis module 226 includes one or more hardware processors that performs the operations described herein for the analysis module 226. In some example embodiments, the analysis module 226 may be distributed across multiple machines or devices.

Figure 3:
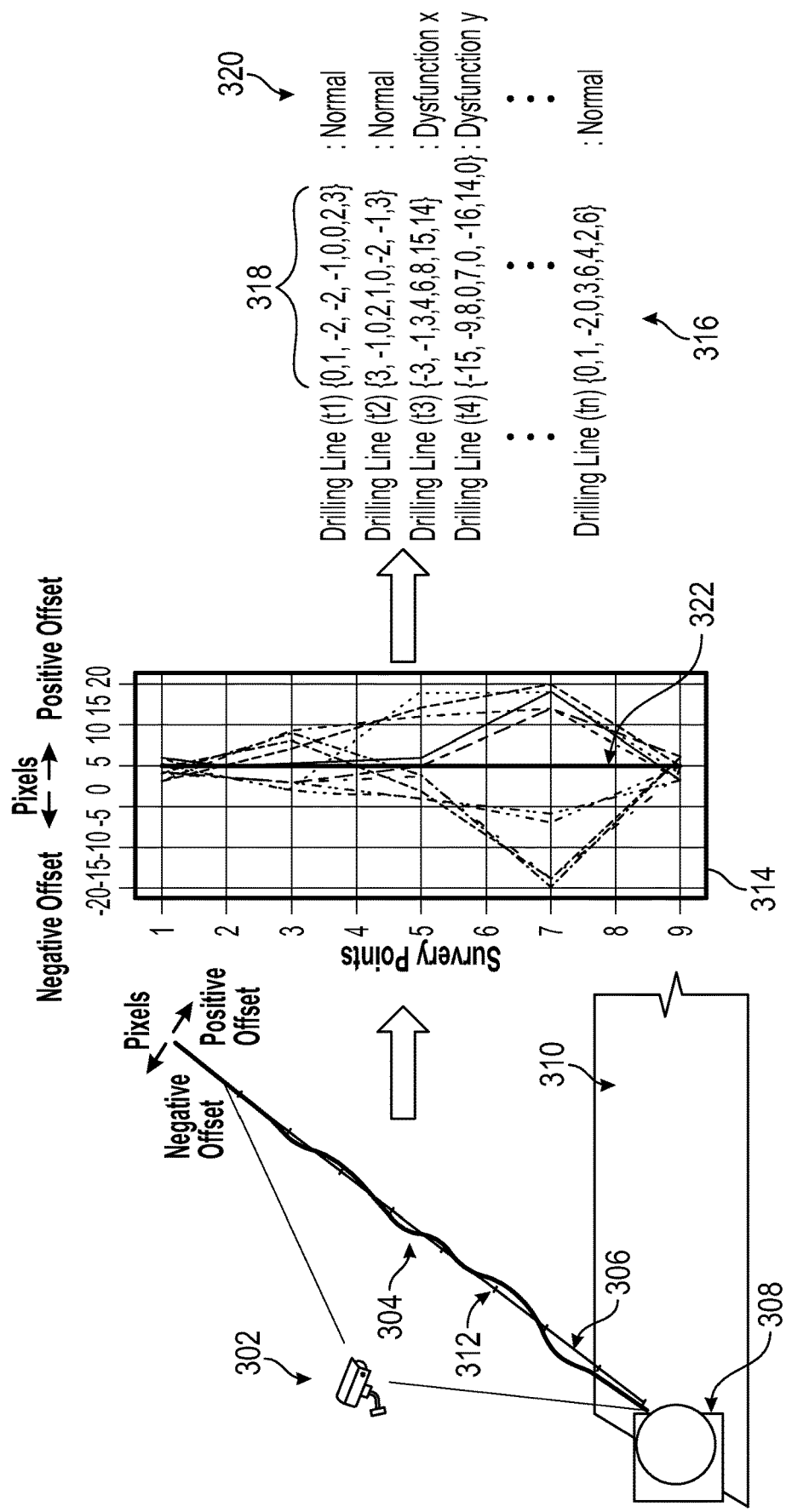
FIG. 3 is a flow diagram that illustrates the monitoring system, according to one or more example embodiments.

FIG. 3 is a flow diagram that illustrates the monitoring system, according to one or more example embodiments. As shown in FIG. 3, the monitoring system may include a contactless sensor, such as camera 302, to capture data pertaining to a parameter of the drill line 304 of a drilling system. For example, the parameter may include movement, vibrations, or deformation of the drill line. One or more cameras 302 may be arranged at one or more positions along the drill line (e.g., in proximity to the drawworks 308 attached to the drill floor 310, the deadline anchor, or the crown block) to capture image data (e.g., one or more images) descriptive of the drill line at various times.

In some example embodiments, the analysis module 226, discussed above with respect to FIG. 2, using one or more image and pixelation techniques, converts the image data captured by the camera 302 at one or more times tn, at one or more survey points 312 along a reference straight line 306, into a digital representation 314 of the drill line 304. Using the reference straight line 306, the analysis module 226 determines a positive or negative pixel offset between the drill line 304 and the reference straight line 306 at particular survey points 312 of the reference straight line 306. As shown in FIG. 3, there are nine survey points along the reference straight line 306, and they are indicated on the vertical axis of the digital representation 314.

In some example embodiments, the analysis module 226, using a machine learning algorithm, converts the digital representation 314 into a machine learning representation 316. The analysis module 226 generates, for each tn, a feature vector (hereinafter also "vector" or "sample") including a number of features equal to the number of survey points. Each feature of the vector represents the number of offset pixels relative to the reference line, at a particular survey point. As such, the vector including the number of offset pixels at to represents a sample $S_{tn}$, such that $S_{tn}=\{x_1, x_2, \ldots, x_n\}: y_{tn}$, where $x_i$ represents a negative/positive pixel offset at the considered survey points, and y is a label that represents a condition observed (or known) during a drilling operation (e.g., y∈{drillingOperation, stick–slip, axial, tangential, lateral}). For instance, a vector $S_{tn}$, generated based on the data captured at time n, includes nine features that represent a set of offset pixels captured at the nine survey points (e.g., $S_{tn}=\{-3,4,2,3,4, -2, -2,0,4\}$). The vector $S_{tn}$ is associated with a label to form a vector-label pair (or vector:label pair). The label represents an observed (or known) behavior (or condition). As shown in FIG. 3, the machine learning representations 316 include the pairs of vectors and labels $S_{tn}: y_{tn}$. The machine learning representations 316 are used as input for training supervised ML models.

As shown in FIG. 3, the vectors $S_{tn}$ are identified by item 318, and the labels $y_{tn}$ are indicated by item 320. The analysis module 226 associates some vectors 318, such as the vectors generated for time t1 and time t2, with the label "normal" to indicate that, at times t1 and t2, the drill string was operating normally. Other vectors may be associated with unwanted conditions. For example, the vector generated for time t3 is associated with "dysfunction x," and the vector generated for time t4 is associated with "dysfunction y," where "dysfunction x" and "dysfunction y" identify certain observed or known unwanted conditions associated with the drill string.

The pairs of vectors and labels $S_{tn}: y_{tn}$ are used as input for training supervised learning models, according to some example embodiments. In various example embodiments, when multiple cameras 302 are used to capture multiple angles of the drilling line, a sample $S_{tn}$ is defined as $S_{tn}=\{\text{offset pixels camera } \#1\}\cup\{\text{offset pixels camera } \#2\}\cup\{\text{offset pixels camera } \#m\}: y_{tn}$, where m refers to the number of cameras. That is, the sample $S_{tn}$ is defined as the union of a number of vectors representing the sets of offset pixels captured at the plurality of survey points, where the number of vectors corresponds to the number of cameras capturing data along the drill line.

In some example embodiments, the analysis module 226 may utilize unsupervised learning algorithms, such as clustering or principal component analysis, among others, for anomaly or outlier detection. The unsupervised ML models may discriminate the vectors with normal operations from those with any kind of dysfunction, and, as such, may identify anomalous drilling line behavior. For instance, the set of samples S containing the offset pixels obtained from normal operation conditions may be collected as a cluster of samples defining normal operations. When new samples (containing the offset pixels) are fed into the model, the distance of the vectors (e.g., a Euclidean distance, a Mahalanobis distance, etc.) may be computed to determine the distance between the observed new sample and the cluster of normal operations. In some instances, an example algorithm identifies a new sample as an anomaly if the distance of the sample is greater than a specified threshold.

In some example embodiments, each anomaly has its own shock wave signature. Data from the drill line shock waves may be correlated with surface drilling data (e.g., torque, weight on bit, or pressure) and subsurface drilling data to perform unsupervised learning of the signatures in the drill line shock waves.

In various example embodiments, additional sensors (e.g., contact or contactless sensors) may be arranged in various locations of the drilling system. The analysis module 226 may access (e.g., receive or obtain) the sensor data captured by a plurality of sensors, and may aggregate and synchronize the captured sensor data in preparation for analysis of the captured sensor data. For example, the features extracted from the image data captured by the camera 302 may be synchronized with information or features extracted from the data captured by other sensors at the drilling rig, such as, drilling surface parameters (e.g., weight on bit, torque, stand pipe pressure, mud flow out, mud flow in, or RPM) or downhole data (e.g., logging-while-drilling (LWD) or measurement-while drilling (MWD)). The aggregated data may be used to generate additional machine learning representations for further training of the ML models used by the monitoring system 220.

FIGS. 4-7 are flowcharts illustrating operations of the monitoring system in performing a method 400 for contactless sensor monitoring of a drill string controlled by a drilling program, according to one or more example embodiments. The drilling program is used to manage the operation of a drilling system (e.g., the drilling rig 140 of FIG. 1). Operations of the method 400 may be performed using the components described above with respect to FIG. 2. One or more blocks in FIGS. 4-7 may be performed by a computing system such as that shown and described below in FIGS. 8A and 8B. While the various blocks in FIGS. 4-7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 4:
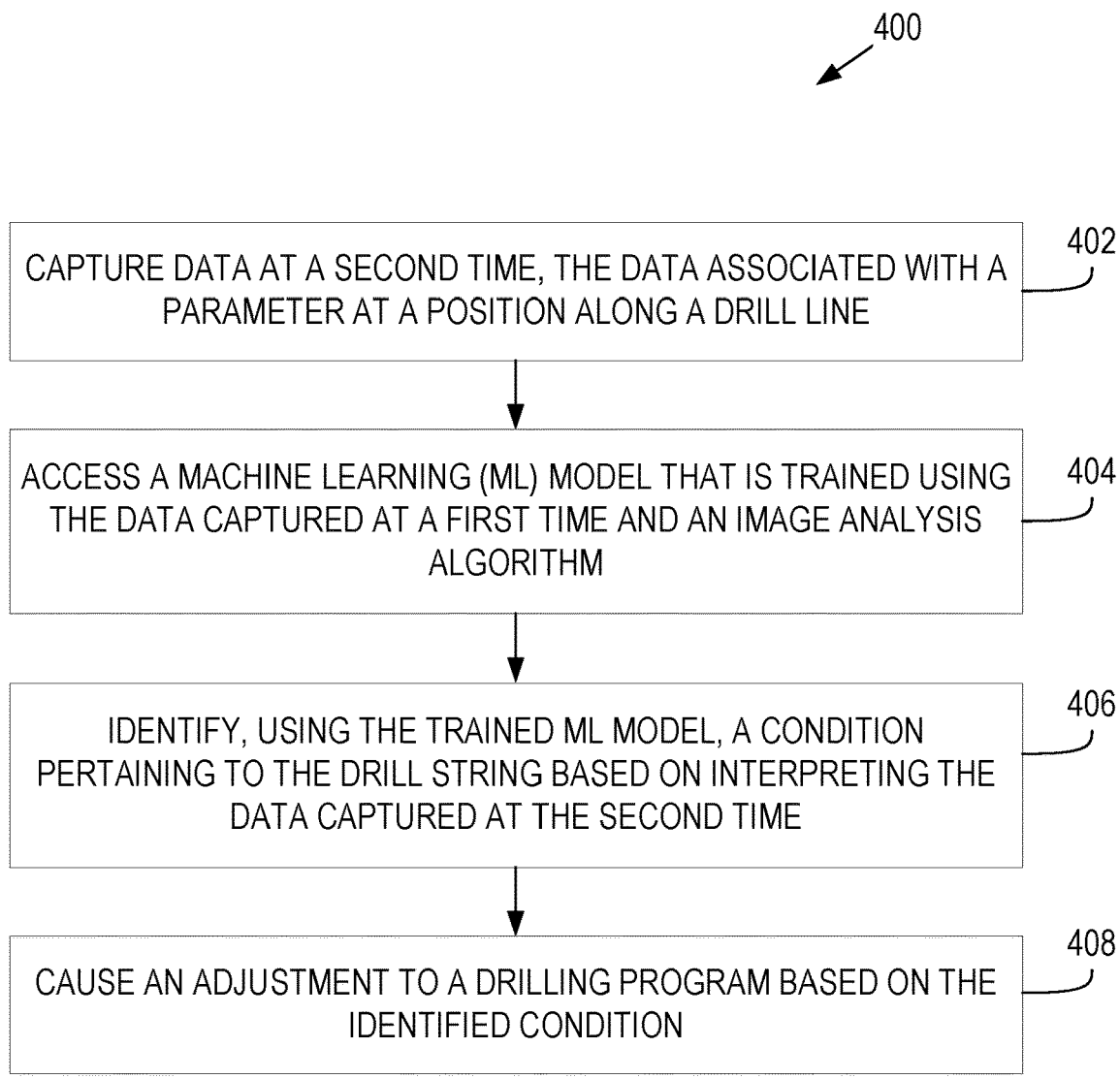
FIGS. 4-7 are flowcharts illustrating operations of the monitoring system in performing a method for contactless sensor monitoring of a drill string controlled by a drilling program, according to one or more example embodiments.

As shown in FIG. 4, at Step 402, the contactless sensor 222 is arranged to capture data at a second time. The data is associated with a parameter at a position along a drill line associated with the drill string. The capturing of the data may include measuring an absolute value of the parameter at a particular time. According to some example embodiments, the capturing of the data includes measuring at least one of an amount of movement of the drill line, an amount of deformation of the drill line, an amount of tension of the drill line, or a volume of a sound. In certain example embodiments, the capturing of the data includes capturing a change in a shape of the drill line.

In some example embodiments, a first portion of the data is captured by the contactless sensor at a first position along the drill line, and a second portion of the data is captured by another sensor arranged to capture data at a second position along the drill line. The other sensor may be a contact sensor or a contactless sensor. The processor may aggregate and synchronize the first portion of the data and the second portion of the data.

In various example embodiments, another sensor is arranged to capture data along the drill string. A first portion of the data is captured by the contactless sensor at a first position along the drill line, and a second portion of the data is captured by the other sensor at a second position along the drill string. The processor may aggregate and synchronize the first portion of the data and the second portion of the data. The other sensor may be a contact sensor or a contactless sensor. The aggregating and synchronizing of the captured data allows the linking of drill string events and drill line behavior with a high degree of accuracy, and the correlation of measurements from different locations of the drilling system. In some instances, an initial set of data is used as a reference for comparison with measurements taken by various sensors at later times.

At Step 404, a processor (e.g., the analysis module 226 of FIG. 2) accesses a machine learning (ML) model that is trained using the data captured at a first time, prior to the second time, and an image analysis algorithm. In some example embodiments, the processor uses the aggregated and synchronized data to train the ML model.

At Step 406, the processor identifies, using the trained ML model, a condition pertaining to the drill string based on interpreting the data captured at the second time. In some example embodiments, to identify the condition, the processor may compare the captured data against known data patterns or data signatures to correlate the captured data with known downhole conditions associated with certain data patterns or data signatures. In certain example embodiments, the identifying, using the trained ML model, of the condition pertaining to the drill string based on the interpreting of the data captured at the second time includes classifying a downhole event either as a normal event or as a particular unwanted condition based on analyzing, using the trained ML model, the data captured at the second time.

At Step 408, the processor causes an adjustment to the drilling program based on the identified condition. The adjustment to the drilling program serves to improve the operation of the drilling system, for example, by maintaining the BHA durability (e.g., by reducing excessive lateral or axial vibrations, reducing stick-and-slips, reducing bit bouncing, identifying formation changes, or identifying drilling breaks) or by optimizing the ROP.

In some example embodiments, the causing of the adjustment to the drilling program based on the identified condition includes performing a modification to an item of equipment associated with the identified condition. In certain example embodiments, the causing of the adjustment to the drilling program based on the identified condition includes generating an alert pertaining to the identified condition, and causing display of the alert in a user interface of a client device. Further details with respect to the operations of the method 400 are described below with respect to FIGS. 5-9.

Figure 5:
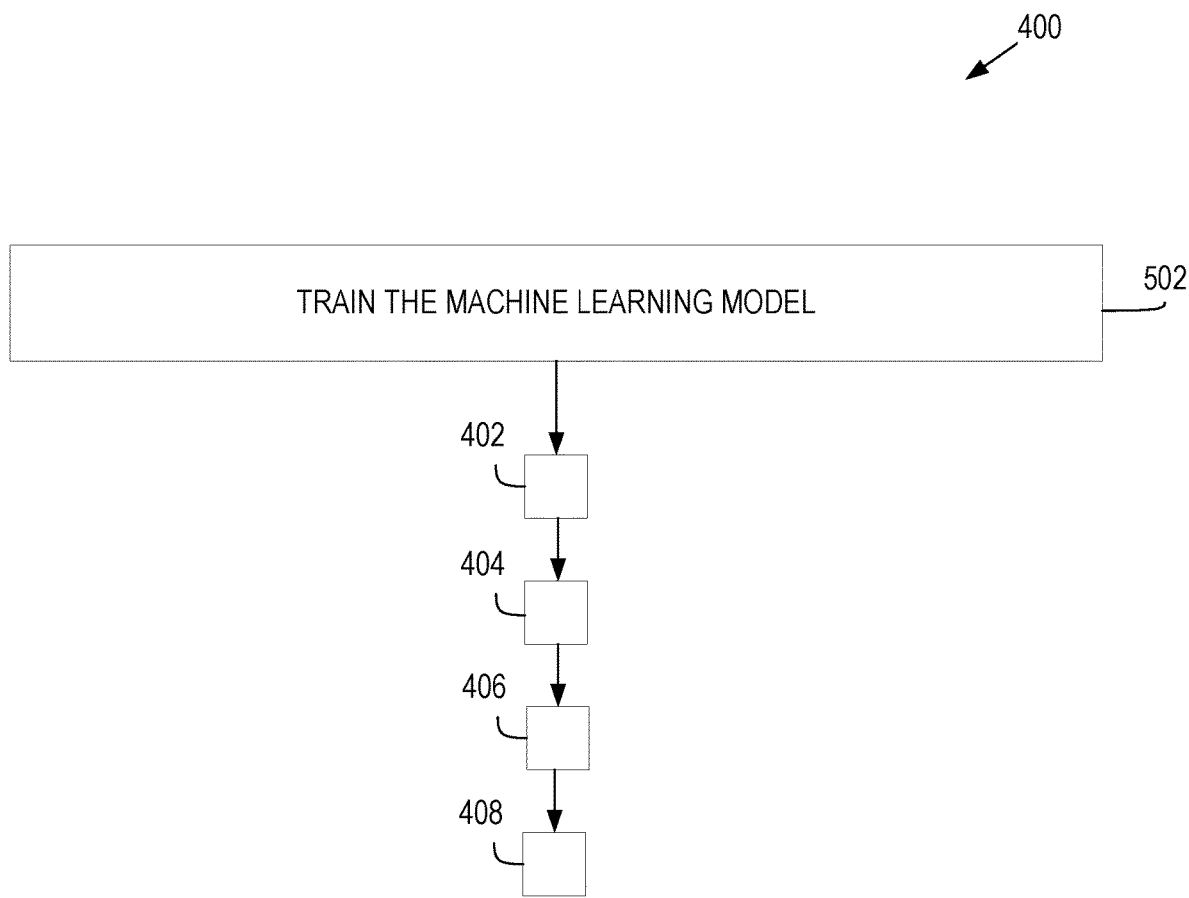

As shown in FIG. 5, the method 400 may include Step 502, according to some example embodiments. Step 502 may be performed before Step 402, in which the contactless sensor 222 is arranged to capture data at the second time. At Step 502, the processor trains the ML model. The ML model is trained using a plurality of feature vectors generated, based on the data captured by one or more sensors, and associated labels. The ML model identifies linear or non-linear correlations among various features, and differentiates the feature vectors associated with normal operations from the feature vectors associated with dysfunctions or anomalies associated with the drilling equipment.

Figure 6:
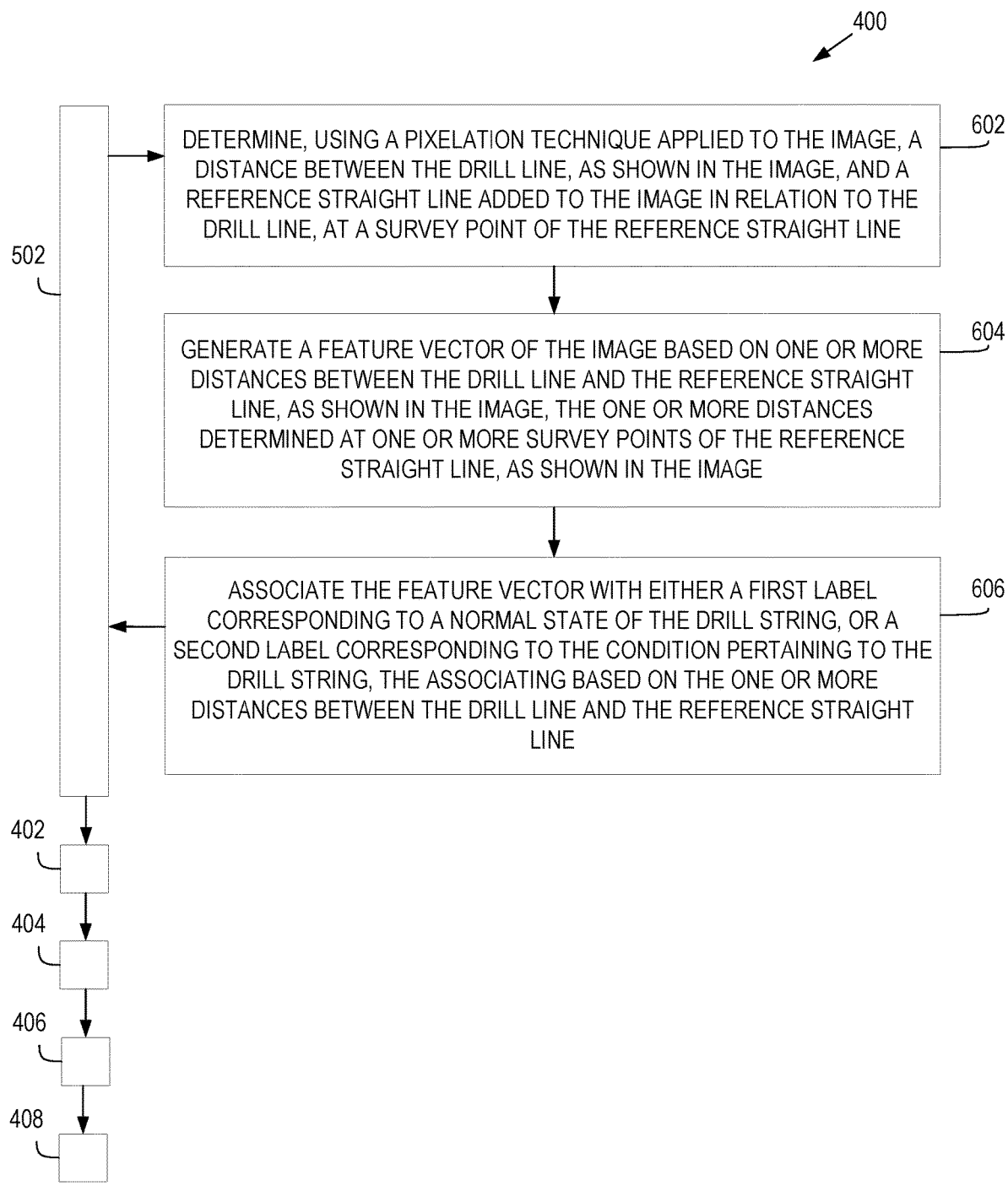

As shown in FIG. 6, the method 400 may include one or more of Steps 602, 604, and 606, according to some example embodiments. In some example embodiments, the contactless sensor includes (e.g., is) a camera. The camera captures an image of the drill line at the first time. Step 602 may be performed as part of (e.g., a precursor task, a subroutine, or a portion) of Step 502, in which the processor trains the ML model.

At Step 602, the processor determines a distance (hereinafter also a "distance value") between the drill line, as shown in the image, and a reference straight line added to the image in relation to the drill line, at a survey point of the reference straight line. To determine the distance value, the processor may use a pixelation technique applied to the image. The distance value may represent a negative or a positive pixel offset in relation to the survey point on the reference straight line.

In some example embodiments, the processor first generates a digital representation of the position of the drill line at the one or more survey points, at one or more times, in relation to the reference straight line, as shown in the image. Then, for the one or more survey points, the processor computes the pixel offset (positive or negative) between the drill line and the reference straight line, as represented in the digital representation.

At Step 604, the processor generates a feature vector of the image based on one or more distances between the drill line and the reference straight line, as shown in the image. The one or more distance values are determined at the one or more survey points of the reference straight line, as shown in the image. In some example embodiments, the feature vector includes one or more vectors of pixel offsets corresponding to a plurality of distance values (e.g., offset pixels) measured between the drill line and the reference straight line at a plurality of survey points, as shown in the image.

At Step 606, the processor associates the feature vector with either a first label corresponding to a normal state of the drill string, or a second label corresponding to the condition pertaining to the drill string. The associating is based on the one or more distances between the drill line and the reference straight line. In some example embodiments, the processor identifies a feature vector as an anomaly if one or more of the distances of the feature vectors exceeds a specified threshold value.

In some example embodiments, the camera included in the contactless sensor is a first camera, the image is a first image, and the feature vector is a first feature vector. The contactless sensor includes a second camera that captures a second image of the drill line. In some instances, another contactless sensor includes the second camera that captures the second image of the drill line. The first camera may capture a first angle of the drill line, and the second camera captures a different (e.g., second) angle of the drill line. In some instances, the second image is captured at the first time. In certain instances, the second image is captured at another (e.g., a third) time, prior to the second time. The data captured by the second camera may be used to train the ML model.

For instance, after Step 604, in which the processor generates the feature vector of the image, as described above with respect to FIG. 6, the processor generates a second feature vector of the second image based on one or more distances determined between the drill line, as shown in the second image, and the reference straight line added to the second image in relation to the drill line. The one or more distances are determined at the one or more survey points of the reference straight line, as shown in the second image. The processor performs a union operation on the first feature vector and the second feature. The processor associates the union of the first feature vector and the second feature vector with either a first label corresponding to the normal state of the drill string, or the second label corresponding to the condition pertaining to the drill string. The associating is based on the one or more distances between the drill line and the reference straight line at the one or more survey points.

Figure 7:
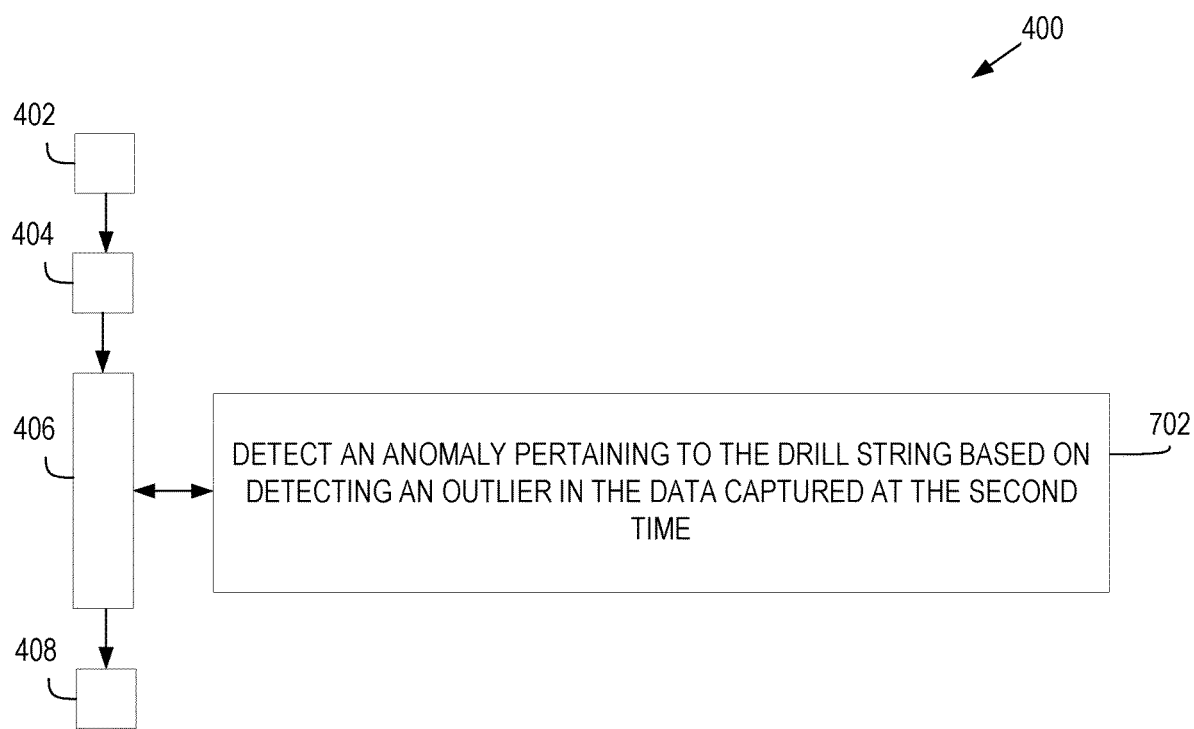

As shown in FIG. 7, the method 400 may include Step 702, according to some example embodiments. Step 702 may be performed as part of (e.g., a precursor task, a subroutine, or a portion) of Step 406, in which the processor identifies, using the trained ML model, the condition pertaining to the drill string based on interpreting the data captured at the second time. At Step 602, the processor detects an anomaly pertaining to the drill string based on detecting an outlier in the data captured at the second time.

In some example embodiments, a value (e.g., a pixel offset) that exceeds a certain threshold value (or is outside a certain range of values) is determined to be an outlier. One or more outliers in a feature vector associated with captured data during current operations may indicate that a certain undesired condition (e.g., an anomaly) is present in the current operations. For instance, if the outlier in the captured data from the current operations matches an outlier in a historical data signature that is associated with an anomaly, then the processor may determine that the captured data identifies the anomaly as being present in the current operations. In some instances, the processor generates an alarm based on the detection of the anomaly, and transmits the alarm to a client device of an operator (e.g., an engineer or administrator) of the drilling system. In some instances, the processor, based on the detection of the anomaly, automatically modifies one or more drilling inputs to remove the system from the boundaries that are causing the downhole dysfunctions as indicated in the signature.

In some example embodiments, as part of training the ML model, the processor assigns a signature to a downhole condition based on a particular downhole event. The processor trains the ML to classify samples (e.g., feature vectors) as normal or anomalous based on whether the samples match (or correlate to) a signature that identifies a particular unwanted downhole condition. Then, as part of identifying the condition pertaining to the drill string based on interpreting the data captured at the second time, the processor, using the trained ML model, recognizes that the downhole condition occurred at the second time. The recognizing is based on matching the data captured at the second time and the signature.

For example, the processor matches a first set of features detected in the data and a second set of features included in a signature accessed from the data repository 202. The processor may identify the condition pertaining to the drill string based on the matching of the first set of features detected in the data and the second set of features included in the signature. The matching indicates the existence of the condition associated with the signature. The processor may recognize the signature of the drill line during unwanted drill string events, such as stick slips, BHA whirl, or bit bouncing, which may lead to failure of the drill string, drilling components, or excessive wearing of the bit.

The processor may cause an adjustment to the drilling program based on the identified condition. In some instances, the causing of the adjustment includes automatically performing a modification to an item of equipment associated with the identified condition. For example, by modifying one or more drilling inputs, the processor may eliminate or minimize an unwanted condition associated with the item of equipment.

In various example embodiments, to perform a modification to the item of equipment, the processor generates an optimized input parameter for the item of equipment based on the identified condition, and transmits an instruction to the drilling system, wherein the instruction refers to the optimized input parameter. The execution of the transmitted instruction using the optimized input parameter may reduce (or eliminate) the identified condition.

Figure 8A:
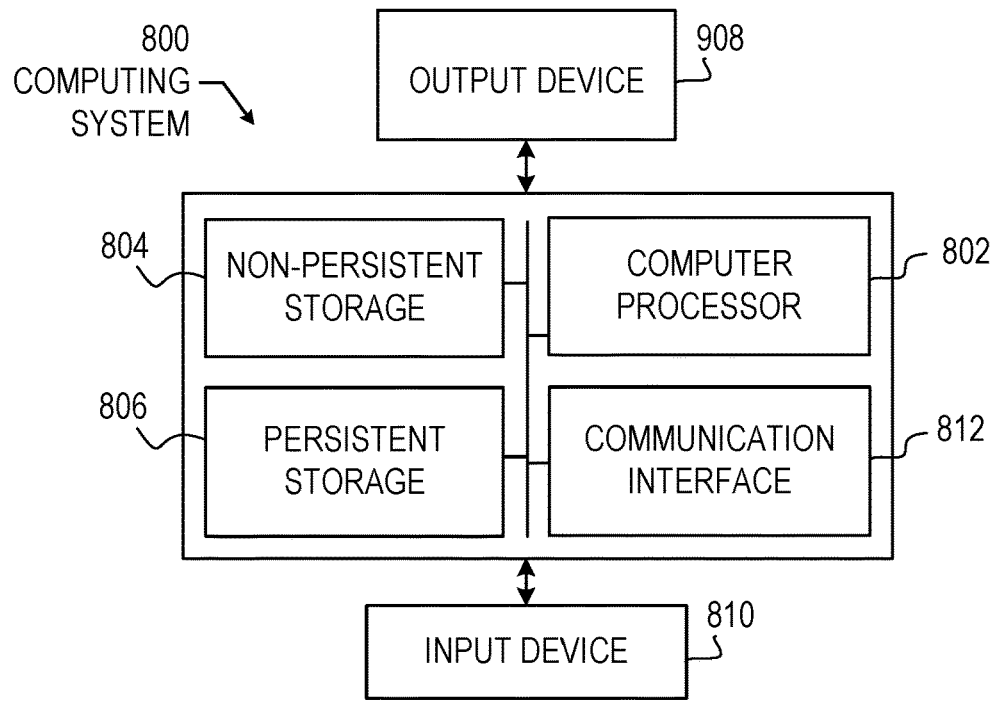
FIGS. 8A and 8B illustrate a computing system, according to one or more example embodiments.

Example embodiments may be implemented on a computing system. Any combination of mobile, desktop, server, router, switch, embedded device, or other types of hardware may be used. For example, as shown in FIG. 8A, the computing system 800 may include one or more computer processors 802, non-persistent storage 804 (e.g., volatile memory, such as random access memory (RAM) or cache memory), persistent storage 806 (e.g., a hard disk, an optical drive such as a compact disk (CD) drive or digital versatile disk (DVD) drive, or a flash memory), a communication interface 812 (e.g., Bluetooth interface, infrared interface, network interface, or optical interface), and numerous other elements and functionalities.

The computer processor(s) 802 may be an integrated circuit for processing instructions. For example, the computer processor(s) 802 may be one or more cores or micro-cores of a processor. The computing system 800 may also include one or more input devices 810, such as a touchscreen, keyboard, mouse, microphone, touchpad, or electronic pen.

The communication interface 812 may include an integrated circuit for connecting the computing system 800 to a network (not shown) (e.g., a local area network (LAN), a wide area network (WAN), such as the Internet, mobile network, or any other type of network) or to another device, such as another computing device.

Further, the computing system 800 may include one or more output devices 808, such as a screen (e.g., a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) 802, non-persistent storage 804, and persistent storage 806. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 8B:
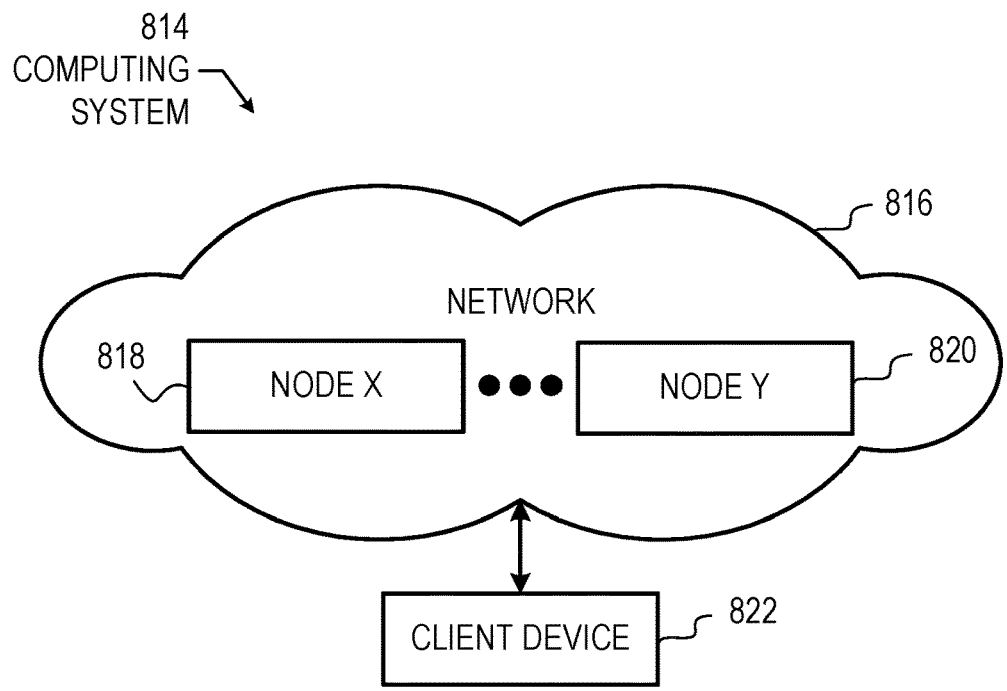

The computing system 800 in FIG. 8A may be connected to or be a part of a network. For example, as shown in FIG. 8B, the network 816 may include multiple nodes (e.g., node X 818 or node Y 820). Each node may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 800 may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (e.g., node X 818 or node Y 820) in the network 816 may be configured to provide services for a client device 822. For example, the nodes may be part of a cloud computing system. The nodes may include functionality to receive requests from the client device 822 and transmit responses to the client device 822. The client device 822 may be a computing system, such as the computing system shown in FIG. 8A. Further, the client device 822 may include or perform all or a portion of one or more embodiments of the disclosure.

The computing system or group of computing systems described in FIGS. 8A and 8B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the selection by the user. Further to the above example, the data received from the server after selecting the URL link may provide a web page in Hyper Text Markup Language (HTML) that may be rendered by the web client and displayed on the user device.

The computing system in FIG. 8A may implement or be connected to a data repository. For example, one type of data repository is a database. A database is a collection of information configured for ease of data retrieval, modification, re-organization, and deletion. Database management system (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, or average), sort (e.g., ascending or descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 8A and the nodes or client device in FIG. 8B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A monitoring system for a drill string controlled by a drilling program, the system comprising:
   a contactless sensor comprising a camera and arranged to capture data at a first time, the data comprising a first image captured by the camera and being associated with a parameter at a position along a drill line associated with the drill string; and
   a processor operatively connected to the contactless sensor and configured to:
      access a machine learning (ML) model that is trained using the data captured at a second time, the second time prior to the first time, and an image analysis algorithm,
      generate a first feature vector of the data captured at the first time, the first feature vector based on one or more distances between the drill line and a reference straight line as shown in the first image,
      generate, using the trained ML model, a prediction that the data captured at the first time corresponds to a condition pertaining to a downhole event of the drill string based on analyzing the first feature vector,
      identify, using the trained ML model, the condition pertaining to a downhole event of the drill string based on, at least in part, the prediction, and
      cause an adjustment to the drilling program based on the identified condition.

2. The monitoring system of claim 1, wherein:
   the camera captures a second image of the drill line at the second time, and
   the processor is further configured to train the ML model, the training of the ML model including:
      determining, using a pixelation technique applied to the second image, a distance between the drill line, as shown in the image, and a reference straight line added to the second image in relation to the drill line, at a survey point of the reference straight line; and
      generating a second feature vector of the second image based on one or more distances between the drill line and the reference straight line, as shown in the second image, the one or more distances being determined at one or more survey points of the reference straight line, as shown in the second image.

3. The monitoring system of claim 2, wherein the training of the ML model further includes:
   associating the second feature vector of the second image with either a first label corresponding to a normal state of the drill string, or a second label corresponding to the condition pertaining to the downhole event of the drill string, the associating being based on the one or more distances between the drill line and the reference straight line.

4. The monitoring system of claim 2, wherein the camera is a first camera
   and the contactless sensor further comprises a second camera that captures a third image of the drill line, the third image being captured at the second time, and
   wherein the training of the ML model further includes:
      generating a third feature vector of the third image based on one or more distances determined between the drill line, as shown in the third image, and the reference straight line added to the third image in relation to the drill line, the one or more distances being determined at the one or more survey points of the reference straight line, as shown in the third image; and
      associating a union of the second first feature vector and the third feature vector with either a first label corresponding to the normal state of the drill string, or a second label corresponding to the condition pertaining to the downhole event of the drill string, the associating being based on the one or more distances between the drill line and the reference straight line.

5. The monitoring system of claim 4, wherein the first camera captures a first angle of the drill line, and the second camera captures a second angle of the drill line.

6. The monitoring system of claim 2, wherein the training of the ML model includes assigning a signature to a downhole condition based on a particular downhole event, and
   wherein the identifying, using the ML model, of the condition pertaining to the downhole event of the drill string includes recognizing that the downhole condition occurred at the first time, the recognizing being based on matching the data captured at the first time and the signature.

7. The monitoring system of claim 1, wherein a first portion of the data is captured by the contactless sensor at a first position along the drill line,
   wherein a second portion of the data is captured by another sensor at a second position along the drill line, and
   wherein the processor is further configured to aggregate and synchronize the first portion of the data and the second portion of the data.

8. The monitoring system of claim 1, wherein a first portion of the data is captured by the contactless sensor at a first position along the drill line,
   wherein a second portion of the data is captured by another sensor at a second position along the drill string, and
   wherein the processor is further configured to aggregate and synchronize the first portion of the data and the second portion of the data.

9. The monitoring system of claim 1, wherein the identifying, using the trained ML model, of the condition pertaining to the downhole event of the drill string includes:
   classifying the downhole event as the condition based on analyzing, using the trained ML model, the data captured at the first time.

10. The monitoring system of claim 1, wherein the identifying, using the trained ML model, of the condition pertaining to the downhole event of the drill string includes:
    detecting an anomaly pertaining to the drill string based on detecting an outlier in the data captured at the first time.

11. The monitoring system of claim 1, wherein the causing of the adjustment to the drilling program based on the identified condition includes performing a modification to an item of equipment associated with the identified condition.

12. The monitoring system of claim 1, wherein the causing of the adjustment to the drilling program based on the identified condition includes:
    generating an alert pertaining to the identified condition; and
    causing display of the alert in a user interface of a client device.

13. A method for monitoring a drill string controlled by a drilling program, the method comprising:
   using a contactless sensor comprising a camera and capturing data at a first time, the data comprising a first image captured by the camera and being associated with a parameter at a position along a drill line associated with the drill string;
   accessing a machine learning (ML) model that is trained using the data captured at a second time, the second time prior to the first time, and an image analysis algorithm;
   generating a first feature vector of the data captured at the first time, the first feature vector based on one or more distances between the drill line and a reference straight line as shown in the first image;
   generating, using the trained ML model, a prediction that the data captured at the first time corresponds to a condition pertaining to a downhole event of the drill string based on analyzing the first feature vector;
   identifying, using the trained ML model, the condition pertaining to a downhole event of the drill string based on, at least in part, the prediction, the identifying being performed by one or more hardware processors; and
   causing an adjustment to the drilling program based on the identified condition.

14. The method of claim 13, wherein the camera capturing a second image of the drill line at the second time, and
   the method further comprises training the ML model, the training of the ML model including:
   determining, using a pixelation technique applied to the second image, a distance between the drill line, as shown in the second image, and a reference straight line added to the second image in relation to the drill line, at a survey point of the reference straight line; and
   generating a second feature vector of the second image based on one or more distances between the drill line and the reference straight line, as shown in the second image, the one or more distances being determined at one or more survey points of the reference straight line, as shown in the second image.

15. The method of claim 14, wherein the training of the ML model further includes:
   associating the second feature vector of the second image with either a first label corresponding to a normal state of the drill string, or a second label corresponding to the condition pertaining to the downhole event of the drill string, the associating being based on the one or more distances between the drill line and the reference straight line.

16. The method of claim 14, wherein the camera is a first camera,
   wherein the contactless sensor further comprises a second camera that captures a third image of the drill line, the third image being captured at the second time, and
   wherein the training of the ML model further includes:
   generating a third feature vector of the third image based on one or more distances determined between the drill line, as shown in the third image, and the reference straight line added to the third image in relation to the drill line, the one or more distances being determined at the one or more survey points of the reference straight line, as shown in the third image; and
   associating a union of the second feature vector and the third feature vector with either a first label corresponding to the normal state of the drill string, or a second label corresponding to the condition pertaining to the downhole event of the drill string, the associating being based on the one or more distances between the drill line and the reference straight line.

17. The method of claim 14, wherein the training of the ML model includes assigning a signature to a downhole condition based on a particular downhole event, and
   wherein the identifying, using the ML model, of the condition pertaining to the downhole event of the drill string includes recognizing that the downhole condition occurred at the first time, the recognizing being based on matching the data captured at the first time and the signature.

18. The method of claim 13, wherein the identifying, using the trained ML model, of the condition pertaining to the downhole event of the drill string includes:
   classifying a downhole event as the condition based on analyzing, using the trained ML model, the data captured at the first time.

19. A non-transitory machine-readable storage medium comprising instructions that, when executed by one or more processors of a machine, cause the machine to perform operations comprising:
   capturing data at a first time with a contactless sensor comprising a camera, the data comprising an image and being associated with a parameter at a position along a drill line associated with the drill string;
   accessing a machine learning (ML) model that is trained using the data captured at a second time, the second time prior to the first time, and an image analysis algorithm;
   generating a feature vector of the data captured at the first time, the feature vector based on one or more distances between the drill line and a reference straight line as shown in the image;
   generating, using the trained ML model, a prediction that the data captured at the first time corresponds to a condition pertaining to a downhole event of the drill string based on analyzing the feature vector;
   identifying, using the trained ML model, a condition pertaining to the downhole event of the drill string based on, at least in part, the prediction; and
   causing an adjustment to the drilling program based on the identified condition.

* * * * *